United States Patent [19]

Triolo et al.

[11] 4,089,718
[45] May 16, 1978

[54] PROCESS FOR MAKING THERMOPLASTIC ELASTOMERIC ARTICLES

[75] Inventors: Louis J. Triolo, Hasbrouck Heights; Donald F. Morgan, Bloomingdale, both of N.J.

[73] Assignee: Amerace Corporation, New York, N.Y.

[21] Appl. No.: 635,697

[22] Filed: Nov. 26, 1975

[51] Int. Cl.$^2$ ............................................. B29H 15/04
[52] U.S. Cl. ..................................... 156/122; 156/113; 156/118; 260/33.6 AQ; 260/897 A; 264/98; 264/150; 264/209; 264/326
[58] Field of Search ................... 264/176 R, 201, 315, 264/209, 326, 150, 94, 96, 98, 331; 260/33.6 AQ, 897 A; 152/330 R, 357 A; 156/118, 122, 503, 113

[56] References Cited

U.S. PATENT DOCUMENTS

| | | | |
|---|---|---|---|
| 1,597,658 | 8/1926 | Fairchild | 264/96 |
| 2,230,879 | 2/1941 | Bronson | 264/96 |
| 2,713,373 | 7/1955 | Daugherty | 156/113 |
| 2,964,083 | 12/1960 | Pfau et al. | 260/33.6 AQ |
| 3,303,243 | 2/1967 | Hughes et al. | 264/96 |
| 3,385,342 | 5/1968 | Eckert | 260/42.33 |
| 3,443,619 | 5/1969 | Kindle | 260/33.6 AQ |
| 3,522,831 | 8/1970 | Torti et al. | 152/357 A |
| 3,554,960 | 1/1971 | Cluff et al. | 260/33.6 AQ |
| 3,653,423 | 4/1972 | Paddock | 152/330 R |
| 3,676,387 | 7/1972 | Lindlof | 260/33.6 AQ |
| 3,835,201 | 9/1974 | Fischer | 260/897 A |
| 3,919,358 | 11/1975 | Batiuk et al. | 260/897 A |

*Primary Examiner*—Jeffery R. Thurlow
*Attorney, Agent, or Firm*—S. Michael Bender; Ken Richardson

[57] ABSTRACT

A process for producing thermoplastic, elastomeric articles such as, for example, semi-pneumatic tires, comprising the steps of admixing a thermoplastic, elastomeric molding composition including a vulcanizable or otherwise thermosetable elastomer, inert filler materials, a plasticizer and certain processing aids. The molding composition is then milled into a flat sheet, extruded into a tubular shape, cut, shaped and then molded at a temperature less than about 70° F into thermoplastic elastomeric articles such as, for example, semi-pneumatic tires.

8 Claims, No Drawings

PROCESS FOR MAKING THERMOPLASTIC ELASTOMERIC ARTICLES

BACKGROUND OF THE INVENTION

The present invention relates generally to a process for making thermoplastic, elastomeric articles such as, for example, thermoplastic semi-pneumatic tires and, more particularly, to a process wherein a thermoplastic, elastomeric molding composition including a vulcanizable or otherwise thermosetable elastomer of the ethylene/propylene type, filler materials, a plasticizer and processing aids is admixed and then molded into thermoplastic, elastomeric articles without being vulcanized.

Thermoplastic, elastomeric articles have, in recent years, become increasingly popular due, in part, to the fact that such thermoplastic, elastomeric articles, while possessing physical properties at least as good as comparable vulcanized elastomeric articles, are more readily mass produced and, in many instances, are lower in cost than comparable thermoset articles. The elimination of the vulcanization step reduces the production time required to fabricate the articles and thus achieves a significant advantage.

Another advantage thermoplastic articles have over comparable vulcanized or thermoset articles is the ability to process scrap material or imperfect articles without the necessity of first having to devulcanize them as is generally required when reprocessing thermoset articles.

Thermoplastic, elastomeric articles have, in the past, proven commercially unacceptable in many instances, due either to their inferior physical properties or to their prohibitively high cost when compared to comparable thermoset articles. Elastomeric articles such as, for example, semi-pneumatic tires, require a fairly high tensile strength and tear strength and must be of sufficient hardness to resist wear. Additionally, such articles should have relatively high elongation since they must be capable of being stretched over a wheel center during make-up.

Against the foregoing background, it is a primary objective of the present invention to provide a process for molding a thermoplastic molding composition into a useful elastomeric article.

It is an additional object of the present invention to provide for a process for molding a thermoplastic, elastomeric molding composition into a useful elastomeric article such as, for example, a semi-pneumatic tire, having a relatively high tensile strength and high elongation.

It is another object of the present invention to provide a process for molding a thermoplastic, elastomeric molding composition into a useful thermoplastic, elastomeric article such as, for example, a semi-pneumatic tire, which possesses physical properties equal or superior to comparable thermoset elastomeric articles.

SUMMARY OF THE PRESENT INVENTION

To the establishment of these and additional objects and advantages, the present invention briefly comprises a process for producing a thermoplastic, elastomeric article, such as, for example, a thermoplastic semi-pneumatic tire, wherein a thermoplastic, elastomeric molding composition including an elastomeric polymer of the EPR type is admixed in a Banbury mixer at a temperature of between about 290° F and about 370° F, with certain inert filler materials, a plasticizer and certain processing aids. The elastomeric polymer is preferably an EPDM terpolymer, the ethylene content of which is in the range of from about 65% to about 85% by weight of the total terpolymer and the diene content of which is no greater than about 4% by weight of the total terpolymer.

The mixture is milled into a flat sheet, extruded into a tubular form at a temperature within the range of from about 270° F to about 300° F, and then cut into predetermined lengths and shaped into the desired donut configuration. The shaped, unmolded article, which is maintained at a temperature of at least about 270° F, is then introduced into a mold and molded at a temperature of no greater than about 70° F into a thermoplastic, elastomeric article, such as, for example, a thermoplastic, semi-pneumatic tire.

DESCRIPTION OF THE PREFERRED EMBODIMENTS

As previously stated, the present invention contemplates a process for molding a thermoplastic, elastomeric molding composition into a useful, thermoplastic, elastomeric article such as, for example, a semi-pneumatic tire. The thermoplastic, elastomeric molding composition may be the same molding composition fully described in concurrently filed U.S. patent application Ser. No. 635,698, now abandoned filed on Nov. 26, 1975, in the name of Louis J. Triolo, one of the joint inventors of the present invention. Concurrently filed U.S. patent application, Ser. No. 635,698, now abandoned entitled THERMOPLASTIC ELASTOMERIC MOLDING COMPOSITION AND ARTICLES MOLDED THEREFROM, has been assigned to the same assignee as the present invention and is incorporated herein by this reference.

The thermoplastic, elastomeric molding composition described in concurrently filed application, Ser. No. 635,698, and herein somewhat more briefly described is comprised of the following ingredients:

1. an elastomeric polymeric ingredient capable of being molded as a thermoplastic, i.e., without being vulcanized;
2. a blend of filler materials;
3. a plasticizer; and
4. processing aids.

The elastomeric polymeric ingredient employed comprises a vulcanizable or otherwise thermosetable elastomeric polymer of the ethylene/propylene type generally referred to as an EPR type. Preferably, the EPR polymeric ingredient is a terpolymer (EPDM) having a viscosity in the range of from about 50 to about 85 Mooney, an ethylene content in the range of from about 65% to about 85% by weight of the total terpolymer and a diene content no greater than about 4% by weight of the total terpolymer. A particularly preferred EPDM terpolymer is marketed by the B. F. Goodrich Chemical Company under the trademark Epcar 847. Epcar 847 is a sulfur-curable, elastomeric terpolymer, the viscosity of which is about 80 Mooney, the ethylene content of which is about 70% by weight of the total terpolymer and the diene content of which is about 4% by weight of the total terpolymer. Epcar 847, heretofore, had been considered as a thermoset material and was used, in particular, as an additive to thermoset polymers for increasing the green strength thereof.

The elastomeric polymeric ingredient selected may comprise amounts in the range of from about 20% to about 50% by weight of the total molding composition with an amount in the range of from about 24% to about 30% by weight of the total composition being preferred. A particularly preferred amount of the elastomeric polymeric ingredient is in the range of from about 26% to about 28% by weight of the total composition.

A blend of filler materials may be added to the elastomeric polymeric ingredient to both reduce the ultimate cost of the article and to impart certain desirable physical properties to the article such as, for example, improved stiffness and resiliency. It is preferred that the blend of filler materials be selected from the group consisting of carbon black, coal dust, clays, calcium carbonate or whiting, silica, phenolic resins, coloring pigments, thermoplastic fillers and mineral rubber.

The presence of carbon black in the molding composition results in the fabrication of molded articles of increased strength. A preferred type of carbon black is the fast extruding furnace black N-550 FEF marketed by Cabot Corporation under the trademark Sterling SO. Carbon black may constitute up to about 40% by weight of the total composition with a preferred amount being in the range of from about 10% to about 28% by weight. A particularly preferred amount of carbon black is in the range of from about 15% to about 18% by weight of the total composition.

Coal dust is another filler material which may be included to increase the hardness and stiffness of the resultant article. Preferred types of coal dust include austin black and anthracite coal dust such as, for example, Carbo-o-fil 325 which is marketed by Shamokin Filler Company. Coal dust may be included in amounts up to about 10% by weight of the total molding composition with a preferred amount being in the range of from about 5% to about 8% by weight. A particularly preferred amount of coal dust is in the range of from about 6% to about 8% by weight of the total composition.

Another type of filler material which may be employed is clay, preferably hydrated aluminum silicate clay. Particularly preferred clays include Apex clay marketed by Thompson, Weinman & Co.; Bardnar clay marketed by J. M. Huber Corp.; Dixieclay marketed by R. T. Vanderbilt Company and the kaolin clay distributed by J. M. Huber Corp. under the trademark Suprex. Clay may be included in an amount up to about 25% by weight of the total molding composition with a preferred amount being in the range of from about 5% to about 10% by weight.

Ground calcium carbonate or whiting may be added to increase the hardness of the resultant article and to impart a white color to the article. Preferred grades of calcium carbonate are marketed by Georgia Marble Co. under the designations No. 9 and No. 10 white and by U.S. Gypsum Co. under the trademark Snow Flake White. Calcium carbonate may be added in an amount of up to about 25% by weight of the total molding composition with an amount in the range of from about 12% to about 22% by weight of the total composition being preferred. A particularly preferred amount of calcium carbonate is in the range of from about 18% to about 21% by weight of the total composition.

Silica is another type of filler material which may be added to increase the hardness and tear strength of the article. Preferred silicas are marketed by PPG Industries, Inc. under the marks HiSil EP, HiSil 233, Silene D and Silene A and by Union Carbide under the trademark Uncar. Silica may be included in amounts up to about 15% by weight of the total composition with an amount in the range of from about 8% to about 12% by weight being preferred. A particularly preferred amount by weight of silica is in the range of from about 8% to about 10%.

Still another type of filler material which may be added to the composition, particularly to improve the heat stability of the resultant article, is a thermoset phenolic hardening resin. Both reactive and non-reactive types of phenolic resins may be selected. A preferred type of reactive phenolic resin, which contains hexamethylene tetramine, is the Union Carbide product designated BRPA - 4494. Preferred types of non-reactive phenolic resins, which lack hexamethylene tetramine, include the phenolic resins marketed by Polymer Applications Inc. under the designations PA-052 and PA-055 and by Union Carbide under the designation BRPA-8081. Phenolic hardening resins may be included in an amount up to about 10% by weight of the total molding composition with an amount in the range of from about 3% to about 7% by weight being preferred.

Thermoplastic filler materials including polyolefins such as, for example, polypropylene and high density polyethylene, may also serve as filler materials, particularly to increase the tensile strength of the resultant molded article. Thermoplastic filler materials may be added to the molding composition in an amount within the range of up to about 5% by weight of the total composition with a preferred amount of thermoplastic filler material being in the range of from about 0.5% to about 4% by weight.

The inclusion of mineral rubber or hard hydrocarbon bituminous petroleum in the composition serves to increase the hardness and stiffness of the resultant article as well as aiding in its processing. Preferred grades of mineral rubber are marketed generically by C. P. Hall Company and R. T. Vanderbilt Company. Mineral rubber may be added to the molding composition in amounts up to about 15% by weight of the total composition with an amount in the range of from about 5% to about 12% by weight being preferred.

A plasticizer, preferably one selected from the group consisting of naphthenic oil, paraffinic oil, aromatic oil, dibutyl phthalate and dioctyl phthalate, may be added to improve the elongation properties of the resultant article. A particularly preferred plasticizer is the naphthenic oil marketed by Sun Chemical Company under the trademark Sunpar 150. The plasticizer may be added to the molding composition in amounts in the range of from about 5% to about 30% by weight of the total composition with a preferred amount being in the range of from about 15% to about 25% by weight.

Processing aids such as, for example, coloring pigments, anti-oxidants, internal lubricants and tackifying agents may also be added, as desired, to the molding composition in a total amount up to about 10% by weight of the total composition. Coloring pigments such as, for example, titanium dioxide and iron oxide may each be added to the molding composition in an amount up to about 5% by weight of the total composition.

Anti-oxidants, preferably anti-oxidants selected from the group consisting of amine, phenolic, sulfide, phenyl alkaline and phosphite type anti-oxidants may be included in the molding composition to reduce oxidation in the resultant article and thus prolong its useable life. A preferred type of anti-oxidant is polymerized 1, 2 dihydro 2, 2, 4 trimethyl quinoline marketed by R. T. Vanderbilt under the trademark Age-Rite Resin D. Anti-oxidants may be included in the molding composition in an amount up to about 1% by weight. A preferred amount of anti-oxidant is within the range of from about 0.2% to about 0.6% by weight of the total composition and a particularly preferred amount of anti-oxidant is in the range of from about 0.2% to about 0.3% by weight.

An internal lubricant or blend of internal lubricants, preferably selected from the group consisting of paraffinic wax and low molecular weight polyethylene wax, may also be included in an amount up to about 3% by weight of the total composition. A preferred amount of internal lubricants is in the range of from about 0.5% to about 3% by weight.

Still another processing aid which may be added to the molding composition is a tackifying agent or tackifier preferably a non-reactive, thermoplastic tackifier having a high melting point such as, for example, alkyl phenol-formaldehyde resin. The tackifier may comprise up to about 1% by weight of the total composition. A preferred tackifying agent is the alkyl phenol-formaldehyde resin marketed by Polymer Applications, Inc. under the designation PA-50-009.

It will be apparent to those skilled in the art that a variety of other ingredients may be added to the molding composition which do not affect the essential nature of the resultant molded article. Many such ingredients may be provided for the purpose of improving industrial acceptance of the molded article.

The aforementioned ingredients are admixed in a conventional internal mixer such as, for example, a Banbury mixer. The order in which the aforementioned ingredients are added to the mixer to form the molding composition is dependent upon the amount of filler material included in the molding composition. In those instances where the percentage of filler materials is in excess of about 50% by weight of the total molding composition, the filler materials, plasticizers and processing aids are first added and admixed in the internal mixer followed by the addition of the elastomeric polymeric ingredient. This type of mixing is generally referred to in the art as up-side down mixing.

In those instances, however, when the percentage of filler materials is less than about 50% by weight of the total composition, it is preferred that the elastomeric polymeric ingredient be first added to the internal mixer and thoroughly masticated prior to the addition of the filler material, plasticizer and processing aids. This procedure is referred to in the art as conventional mixing.

The temperature of the internal mixer, in either case, should be maintained within the range from about 290° F to about 370° F with a temperature of about 325° F being preferred. Complete mixing of all ingredients is generally completed in less than about eight minutes.

The resultant molding composition which takes the form of a dough-like mass upon removal from the mixer, is then passed through a conventional rubber milling machine, preferably of the two roll type, to form a flattened sheet. The composition, in sheet form after milling, is then stripped off the milling machine and introduced into a heated barrel extruder and extruded into a continuous tubular shape having a hollow center. When the temperature of the sheet-like material introduced into the extruder is above about 270° F such as, for example, when the composition is extruded immediately after admixture and milling, a conventional short barrel, hot feed extruder is preferred. The temperature of the short barrel extruder should be maintained at a temperature within the range of from about 270° F to about 325° F with a temperature ranging from about 280° F to about 300° F being preferred. The temperature of the tubularly shaped composition, as it leaves the extruder, is generally in the range from about 270° F to about 300° F. When the temperature of the sheet-like material introduced into the extruder is below about 270° F such as, for example, when the molding composition is not extruded immediately after admixing and milling, a conventional long barrel, cold feed extruder is preferred. The long barrel, cold feed extruder should be maintained at a temperature within the range from about 300° F to about 400° F.

The extruded tubularly shaped composition is then cut into predetermined lengths such as, for example, lengths which correspond to the circumference of the semi-pneumatic tire to be molded. Cutting may be accomplished by any conventional cutting or shearing device. After cutting into desired lengths, the tubularly shaped composition is then shaped into any desired configuration. For example, when the article to be molded is a semi-pneumatic tire, the ends of the fixed sections are mechanically butt-spliced together to form a donut or ring-shaped unmolded article which is then introduced into a conventional mold, such as, for example, a semi-pneumatic tire mold. The ring-shaped unmolded article, upon introduction into the mold, should be maintained at a temperature to facilitate molding. It has been found that viscosity and flow characteristics of the unmolded article are optimal for molding when the temperature of the unmolded article is maintained within the range of from about 270° F to about 300° F.

In molding a semi-pneumatic tire, the tire mold includes one or more needles adapted to penetrate into the hollow center of the tubular outer portion of the ring-shaped unmolded article upon sealing of the mold. Air pressure is introduced into the ring-shaped unmolded article upon sealing of the mold. Air pressure is introduced into the hollow center through the one or more of such needles. The mold should be unheated and maintained at a temperature substantially below the temperature of the unmolded article introduced into the mold, preferably within the range of from about 50° F to about 70° F. The mold may be sealed by the application of an external pressure sufficient to keep the mold tightly closed in order to prevent flashing. In molding a semi-pneumatic tire, the one or more air injection needles are introduced into the hollow center of the tubular outer portion of the ring-shaped unmolded article within about 15 seconds after closing and sealing the mold. The introduction of compressed air at a pressure within the range of from about 80 to about 120 psi through the one or more needles is generally sufficient to force the tubular outer portion of the ring-shaped unmolded articles against the inner walls of the mold. The mold time is generally dependent upon the size and shape of the article, although a mold time of less than about two minutes is normally sufficient to mold a thermoplastic article such as, for example, a semi-pneumatic tire.

The mold is then depressurized and the finished article is removed and, if necessary, trimmed.

It will be appreciated that the ring-shaped, unmolded article need not be molded immediately after extrusion and shaping, but may be stored for a period of time. In such cases, the ring-shaped, unmolded article, before molding, should be heated to a temperature above about 270° F. This may be accomplished by the use of conventional heating means such as, for example, convection, conduction, or microwave heaters.

The following examples serve to illustrate certain preferred embodiments of the present invention and are not to be construed as limiting the scope of the present invention.

EXAMPLE I

A molding composition suitable for molding an elastomeric semi-pneumatic tire was prepared comprising the following ingredients with their respective amounts being specified as a percentage weight of the total weight of the composition:

| Ingredients | Percentage By Weight |
|---|---|
| EPDM terpolymer | 27.4% |
| N-550 FEF carbon black | 16.4% |
| anthracite coal dust | 6.8% |
| calcium carbonate | 19.2% |
| hydrated silica | 9.6% |
| naphthenic oil | 17.8% |
| polymerized 1, a dihydro 2, 2 4 trimethyl quinoline | 0.3% |
| paraffinic wax | 1.4% |
| polyethylene wax | 1.4% |

The above ingredients were added to a Banbury mixer in the following order: EPDM terpolymer, filler materials, plasticizers and processing aids. The ingredients were then admixed in the Banbury mixer at a temperature of about 325° F. Mixing continued until all ingredients became uniformly dispersed.

The resultant composition was then milled on a two roll milling machine into a flat sheet and then fed into a short barrel, hot feed extruder and extruded into a continuous tubular shape at a temperature of about 325° F. The temperature of the tubularly shaped composition, after extrusion, was about 275° F.

The tubularly shaped composition was then cut into prescribed lengths, each length approximately equal to the circumference of a semi-pneumatic tire having a six inch diameter. The ends of each section were then mechanically butted together to form a ring-shaped unmolded article which was then introduced into a conventional semi-pneumatic tire mold, the temperature of which was maintained at about 70° F. After sealing the mold compressed air was introduced into the hollow center of the tubularly shaped portion of the ringshaped unmolded article in order to force the tubularly shaped portion against the inner walls of the mold. After molding, the resultant semi-pneumatic tire had the following physical properties:

Tensile Strength; 700 psi
Elongation; 565%
Modulus 200%; 370%
Modulus 200%; 580%
Crescent Tear Strength; 265
Hardness (Shore A); 75
Specific Gravity; 1.2

The foregoing physical properties are comparable to the physical properties of a commercially acceptable thermoset, semi-pneumatic tire.

EXAMPLE II

In order to demonstrate the effect of practicing the instant invention with a different combination or blend of filler materials, particularly where austin black was used as a filler material and where the constituent ingredients were admixed in a different manner, a molding composition suitable for making an elastomeric semi-pneumatic tire was prepared comprising the following ingredients in the following percentages

| Ingredients | Percentage By Weight |
|---|---|
| EPDM terpolymer | 25.7% |
| N-550 FEF carbon black | 18.0% |
| austin black | 7.7% |
| calcium carbonate | 20.6% |
| hydrated silica | 9.0% |
| naphthenic oil | 16.7% |
| polymerized 1, 2 dihydro 2, 2, 4 trimethyl quinoline | 0.3% |
| paraffinic wax | 1.3% |
| polyethylene wax | 0.8% |

The composition was fabricated into a semi-pneumatic tire in the same manner as the composition of Example I except that during mixture of the molding composition, the EPDM terpolymer ingredient was added to the Banbury mixer subsequent to the addition of the filler material, processing aids and plasticizer. The resultant molded tire exhibited the following physical properties:

| Tensile Strength | 614 psi |
|---|---|
| Elongation | 713% |
| Modulus 200% | 296% |
| Modulus 300% | 375% |
| Crescent Tear Strength | 160 |
| Hardness (Shore A) | 72 |
| Specific Gravity | 1.245 |

It will be noted that the physical properties of the molded semi-pneumatic tire of this Example were similar to the properties of the molded tire of Example I and were considered generally commercially acceptable. While the tensile strength of the molded tire of this Example was lower than the tensile of the molded tire of Example I, the elongation of the former was significantly higher than the latter, indicating that an elastomeric article with greater flexibility was produced.

EXAMPLE III

In order to demonstrate the effect of practicing the present invention with still a different blend of filler materials, particularly where hard clay was used as a filler material, a molding composition suitable for making an elastomeric semi-pneumatic tire was prepared comprising the following ingredients in the following percentages:

| Ingredients | Percentage By Weight |
|---|---|
| EPDM terpolymer | 26.7% |
| N-550 FEF carbon black | 16.0% |
| hard clay | 8.0% |
| calcium carbonate | 21.3% |
| hydrated silica | 9,3% |
| naphthenic oil | 16.0% |
| polymerized 1, 2 dihydro 2, 2, 4 trimethyl quinoline | 0.3% |
| paraffinic wax | 1.1% |
| polyethylene wax | 1.1% |
| hydrated silica | 0,3% |

The above ingredients were fabricated into a semipneumatic tire according to the process described in Example I except that the ingredients were added to the Banbury mixer in the following order: calcium carbonate, both hydrated silicas, clay, EPDM terpolymer, naphthenic oil, carbon black, paraffinic wax, polyethylene wax and the trimethyl quinoline. The resultant tire exhibited the following physical properties:

| Tensile Strength | 568 psi |
|---|---|
| Elongation | 597% |
| Modulus 100% | 305% |
| Modulus 200% | 392% |
| Modulus 300% | 476% |
| Specific Gravity | 1.227 |
| Crescent Tear Strength | 172 |

It will be noted that the physical properties of the resultant semi-pneumatic tire were similar to the tire molded according to the processes of Examples I and II although the tire of this Example did have a somewhat lower tensile strength than the tires of Examples I and II.

EXAMPLE IV

In order to demonstrate the effect of practicing the present invention with still a different blend of filler materials, particularly one which included a phenolic resin, a molding composition suitable for making an elastomeric semipneumatic tire was prepared comprising the following ingredients in the following percentages:

| Ingredients | Percentage By Weight |
|---|---|
| EPDM terpolymer | 26.3% |
| N-550 FEF carbon black | 15.8% |
| anthracite coal dust | 6.6% |
| calcium carbonate | 21.1% |
| hydrated silica | 9.2% |
| hydrated silica | 0.5% |
| naphthenic oil | 17.1% |
| polymerized 1, 2 dihydro 2, 2, 4 trimethyl quinoline | 0.3% |
| paraffinic wax | 1.1% |
| polyethylene wax | 1.1% |
| phenolic resin | 1.6% |

The composition was fabricated into a semi-pneumatic tire in essentially the same manner as in Example III and exhibited the following physical properties:

| Tensile Strength | 515 psi |
|---|---|
| Elongation | 812% |
| Modulus 100% | 216% |
| Modulus 200% | 237% |
| Specific Gravity | 1.203 |
| Crescent Tear Strength | 133 |

It is noted that the physical properties of the resultant semi-pneumatic tire indicated extremely good elongation, due principally to the inclusion of the phenolic resin.

Although the foregoing Examples illustrate the formation of thermoplastic, elastomeric semi-pneumatic tires, it will be appreciated that the present process may be employed to fabricate other useful articles as well. Accordingly, the present invention should be limited only to the scope of the appended claims.

Wherefore we claim:

1. A process for producing a useful thermoplastic, elastomeric article such as, for example, a semi-pneumatic tire, said process comprising the steps of:
   a. forming a molding composition consisting essentially of:
      i. a vulcanizable EPDM elastomeric terpolymer in an amount within the range of from about 25% to about 28% by weight of the total composition;
      ii. an inert filler free from polyolefins in an amount within the range of from about 52% to about 56% by weight of the total composition, said filler comprising a blend of different filler materials; and
      iii. the remainder of said composition being made up of plasticizers and processing aids;
   b. extruding said molding composition into a tubular form;
   c. shaping said tubularly formed composition into an unmolded article of a predetermined shape;
   d. maintaining said unmolded article of predetermined shape at a temperature within a range from about 270° F to about 300° F to facilitate molding;
   e. introducing said unmolded article at said temperature to facilitate molding, into a mold; and
   f. molding said unmolded article of predetermined shape free from vulcanization at a temperature substantially below said temperature of said unmolded article into said useful thermoplastic, elastomeric article and wherein the step (f) of molding said unmolded article of predetermined shape further comprises the steps of maintaining said mold at a temperature within a range from about 50° F to about 70° F, sealing said mold and causing said outer tubular portion to expand and conform to the inner surface of said mold.

2. A process for producing a thermoplastic, elastomeric, semi-pneumatic tire, said process comprising the steps of:
   a. combining in a Banbury mixer at a temperature of about 325° a composition consisting essentially of the following:
      i. vulcanizable elastomeric EPDM terpolymer in an amount within the range of from about 25% to about 28% by weight of the total composition, wherein the ethylene content of said elastomeric terpolymer is in the range from about 65% to about 85% by weight of the total terpolymer, wherein the diene content of said terpolymer is no greater than about 4% by weight of the total terpolymer and wherein the viscosity of said terpolymer is in the range of from about 50 to 80 Mooney;
      ii. inert filler materials free from polyolefins in an amount within the range from about 52% to about 56% by weight of the total composition, said filler materials comprising a blend of different inert filler materials, said blend being selected from the group consisting of carbon black, coal dust, clay, calcium carbonate, silica, and phenolic resin;
      iii. a plasticizer in an amount within the range from about 15% to about 18% by weight of the total composition, said plasticizers consisting of naphthenic oil; and
      iv. processing aids in an amount within the range of up to about 3% by weight of the total composition, said processing aids being selected from the group consisting of antioxidants, and lubricants;
   b. milling said composition into sheet form;
   c. extruding said sheet-like composition at a temperature within the range of from about 280° F to about 300° F into a tubular form having a hollow center;

d. cutting said tubularly shaped composition into sections of predetermined length and mechanically splicing together the ends thereof to form a ring-shaped unmolded article;

e. introducing said ring-shaped, unmolded article, maintained at a temperature of about 270° F into a compression mold maintained at a temperature below about 70° F; and f. molding said ring-shaped, unmolded article into a semi-pneumatic tire free from vulcanization by sealing said mold, inserting at least one needle into the hollow center of the tubular portion of said ring-shaped unmolded article, and introducing air pressure into said hollow center to expand the tubular portion of said ring-shaped unmolded article against the inner surface of said mold.

3. The process of claim 1 wherein the step of combining said molding composition comprises the step of admixing said molding composition in a Banbury mixer at a temperature in the range from about 290° F to about 370° F.

4. The process of claim 1 further including the step of milling said composition into sheet form after combining and prior to extruding.

5. The process of claim 1 wherein the step of extruding said molding composition comprises the step of extruding said molding composition in a heated, short barrel extruder at a temperature within the range of from about 270° F to about 325° F.

6. The process of claim 1 wherein the step of shaping said tubularly formed composition comprises the steps of cutting said tubularly formed composition into sections of predetermined length and joining the ends thereof to form a ring shaped unmolded article having an outer tubular portion.

7. The process of claim 1 wherein the step of maintaining said unmolded article of predetermined shape at said temperature includes the step of preheating said unmolded article to said temperature within said range from about 270° F to about 300° F.

8. The process of claim 6 wherein said outer tubular portion includes a hollow center and wherein the step of causing said outer tubular portion to expand comprises the step of introducing compressed air into the hollow center of said outer tubular portion with a means adapted to penetrate into said hollow center.

* * * * *